United States Patent Office 3,429,805
Patented Feb. 25, 1969

---

3,429,805
B.t.u. REGULATION OF A MATERIAL STREAM
Joseph T. Karbosky, c/o Phillips Petroleum Company,
Bartlesville, Okla. 74003
Filed Mar. 10, 1967, Ser. No. 622,342
U.S. Cl. 208—354                                9 Claims
Int. Cl. C10g 5/06, 7/00; C10l 3/00

ABSTRACT OF THE DISCLOSURE

A method of obtaining a desired heating value in a gas stream by flashing a fluid stream to obtain overhead vapors which are combined with the gas stream, fractionating liquid from the flash step to obtain a second vapor stream which is combined with the gas stream, measuring the heating value of the combined stream and regulating the temperature of the flashing or fractionation step in accordance with the measured value.

---

This invention relates to a method for controlling the heating value of a material exiting from a process by controlling the temperature conditions in the process.

The effective regulation of the heating value of a stream exiting from an industrial process can be of substantial benefit. Heating value, in this application, will be defined as the energy per volume, or mass, derived from combusting a material with oxygen and may be expressed as B.t.u. per cubic foot. When various stages of a process are, in part, responsible for increasing the heating value of the process exiting material, regulation of the heating value of the output stream is difficult. Moreover, this problem increases when the process output stream is to be blended with an extraneous stream in order to elevate the heating value of the extraneous stream to a predetermined level.

The problem of upgrading the heating value of a hydrocarbon stream is often associated with low temperature helium extraction processes. In a typical process, natural gas containing small amounts of helium is introduced into the process and a multiplicity of boiling point separations are effected by cryogenic methods. Typically, a helium concentrate and a natural gasoline fraction are removed from the natural gas. As a consequence, a residue gas stream consisting essentially of methane and nitrogen is produced having a heating value below that of the natural gas. Usually the heating value of this residue gas must be increased to provide a commercial product. The residue gas can be fortified by adding to it the lighter constituents from the natural gasoline fraction. Since the natural gasoline fraction is of a higher economic value than the fortified residue gas, the minimal amount of lighter constituents should be used to provide a salable residue gas product.

Prior art teaches that the control of the heating value of a process exit gaseous product can be achieved through manual metering of said exit product and manual metering and controlling of conditions of flow, temperature, pressure, etc., in the particular process units. This method of control is sometimes difficult in that it demands a continual manual operation of metering and control. The invention comprises improvement over the prior art by providing a method whereby the process of manual metering and manual controlling of a variety of process variables can be supplanted by manual or automatic metering combined with manual or automatic control of the process temperatures to obtain an exit gaseous stream having a desired heating value.

According to the invention, the heating value of a first gas stream, such as the residue gas stream from a gas separation process, is maintained within a predetermined range by flashing a fluid stream, such as a natural gasoline fraction, to obtain a first flashed vapor stream having a higher heating value than the first gas stream and a first liquid fraction; fractionating the first liquid fraction to obtain a second vapor fraction of higher heating value than the first gas stream and a second liquid fraction; combining the first and second vapor fractions with the first gas stream; measuring the heating value of the combined stream and regulating temperatures in the flashing and/or the fractionation steps in response to the measured heating value to maintain a desired heating value in the combined stream.

In one embodiment, the invention comprises a method of varying the heating value of the overhead products of a flash tank and fractional distillation unit by regulating the temperature of the feed material that is to be introduced into the flash tank. Thus, if the heating value of the residue gas is too low, the temperature of the flash tank inlet stream is increased to cause a greater percent of the inlet stream to be flashed and go overhead from the flash tank thereby increasing the amount and the heating value of the flashed vapor stream which is combined with the residue gas stream. Conversely, if the value of the residue gas is too high, the temperature of the feed to the flash tank is decreased permitting more heavy components to proceed through to the fractionation step for sale as natural gasoline. Accordingly, the maximum profit is realized through sale of the natural gasoline (the second liquid fraction) while producing residue gas which can be used as fuel.

In another embodiment, a flash tank is employed prior to the fractional distillation unit to raise the reflux cooling temperature that can be used on the fractional distillation unit. This eliminates necessity of using low temperature refrigeration for condensing overhead vapors for a reflux stream by permitting the use of a water-cooled heat exchanger. Although this particularly beneficial in reducing the cost of fractionation in this embodiment, the invention is not to be so limited. In fact any number of fractional separation means may be used to suit the needs of the particular process.

Accordingly, it is an object of this invention to provide a method for combining a plurality of streams to produce a combined stream of desired predetermined heating value.

Another object of this invention is to increase the yield of liquid product from a fractional separation process wherein the heating value of an exit gas stream is controlled.

These and other objects of the invention will be apparent to one skilled in the art upon consideration of the following description, the drawing, and the appended claims.

Figure 1:
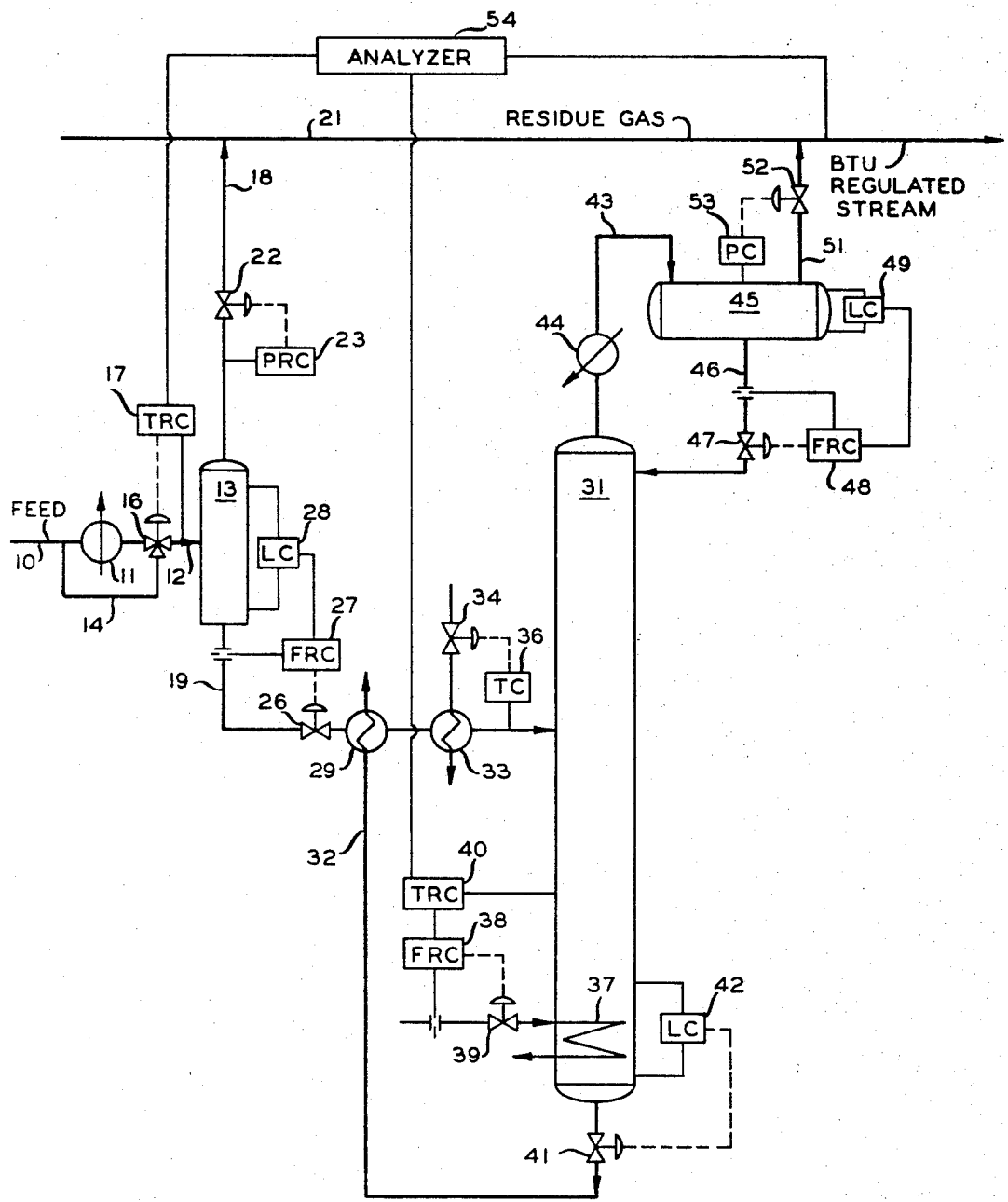
FIGURE 1 is a flow diagram of one embodiment of the invention.

Referring now to the drawings, wherein like reference numerals denote like elements in the different figures, in FIGURE 1 a fluid, such as a natural gasoline fraction, flows through feed conduit 10 to heat exchanger 11 and through conduit 12 to flash tank 13. The inlet temperature of the feed stream is regulated by conducting a portion of the fluid in conduit 10 through conduit 14 to bypass heat exchanger 11, and admixing the streams in conduit 12 by use of a three-way valve 16. A temperature recorder controller 17 regulates valve 16 to control the amount of fluid bypassing heat exchanger 11 and to obtain a desired temperature level in the feed to flash tank 13.

In flash tank 13, the fluid is flashed to obtain a vapor fraction which is removed overhead through conduit 18 and a liquid fraction which is recovered through conduit 19. The flashed vapor fraction flowing in conduit 18 is combined with a low heating value residue gas flowing in conduit 21. This residue gas stream can be the off-gas stream from a natural gas separation process or it can originate from other sources. A constant pressure is maintained in tank 13 by providing a valve 22 in conduit 18 which is regulated by pressure recorder controller 23.

Flow of liquid from tank 13 is regulated by valve 26 which is controlled by flow recorder controller 27. Tank 13 is provided with a liquid level controller 28 which resets flow recorder controller 27 to maintain a constant liquid level in tank 13. The flash tank bottoms in conduit 19 are increased in temperature by heat exchange in heat exchanger 29 with bottoms product from fractionator 31 which flow through conduit 32. The temperature of the stream flowing in conduit 19 is further increased by heating in heater 33 to a level which is desired for fractionator feed. The temperature is regulated by passage of steam to heat exchanger 33 through valve 34 which is controlled by temperature controller 36.

The temperature regulated flash tank bottoms are fractionated in fractionator 31 to obtain a vapor fraction and a liquid fraction. A reboiler heating coil 37 is used to maintain a desired kettle temperature in fractionator 31. Flow recorder controller 38 controls the flow of steam through valve 39 to coil 37. A temperature recorder controller 40 resets flow recorder controller 38 and controls the steam flow to maintain a constant temperature in fractionator 31.

The fractionator bottoms product is removed through conduit 32 having a valve 41 which is regulated by liquid level controller 42 to maintain a desired liquid level in fractionator 31. After heat exchange with the flash tank bottoms in heat exchanger 29, the fractionator bottoms product is recovered or processed in other steps.

The vapor fraction is removed overhead from fractionator 31 via conduit 43 through a condenser 44 to a reflux accumulator 45. Condensed reflux liquid flows from accumulator 45 to fractionator 31 through conduit 46. Reflux flow through valve 47 in conduit 46 is controlled by flow recorder controller 48. A liquid level controller 49 senses the liquid level in reflux accumulator 45 and resets flow recorder controller 48.

Vapor from accumulator 45 flows through conduit 51 and is combined with the flash vapors and residue gas in conduit 21. A valve 52 in conduit 51 is regulated by pressure controller 53 to maintain a desired pressure in accumulator 45.

An analyzer 54 senses the heating value of the residue gas passing through conduit 21 after it is admixed with the overhead vapors from flash tank 13 and fractionator 31. The analyzer controls the temperature of the feed stream in conduit 12 by adjusting the setpoint of temperature recorder controller 17 in accordance with the measured heating value.

If the heating value of the residue gas decreases, the decrease is sensed by the analyzer 54 and controller 17 is actuated to increase the temperature of the feed to flash tank 13. As a result, more of the lighter components of the feed stream go overhead and are admixed with the residue gas to increase its heating value to the desired level. Should the heating value of the residue gas become higher than required, the increase is sensed by the analyzer 54 and the controller 17 is actuated to decrease the temperature of the feed to the flash tank 13. Thus, the heavier components of the feed stream appear in the flash tank bottoms product and are further fractionated.

As a result of regulating the separating of flash tank 13, the operating conditions of fractionator 31 need not be changed in accordance with minor variations in the heating value of the residue gas. The fractionator can be operated under substantially steady state conditions to provide maximum sufficiency of operation and optimal recovery of heavy components from the feed stream.

Another method of controlling the heating value of the gas flowing in line 21 is to use analyzer 54 to reset temperature recorder controller 40 and vary the temperature in fractionator 31 to increase or decrease the heating value of vapors flowing in conduit 51 and obtain the desired heating value in the combined gas stream. For example, when the heating value of the gas in line 21 is too low, analyzer 54 changes the setpoint in temperature recorder controller 40 to raise the temperature in fractionator 31 by increasing the steam flow through valve 39. This in turn vaporizes more of the feed to fractionator 31 and increases the amount of heating value of the overhead vapor stream from fractionator 31 to be combined with the residue gas.

Figure 2:
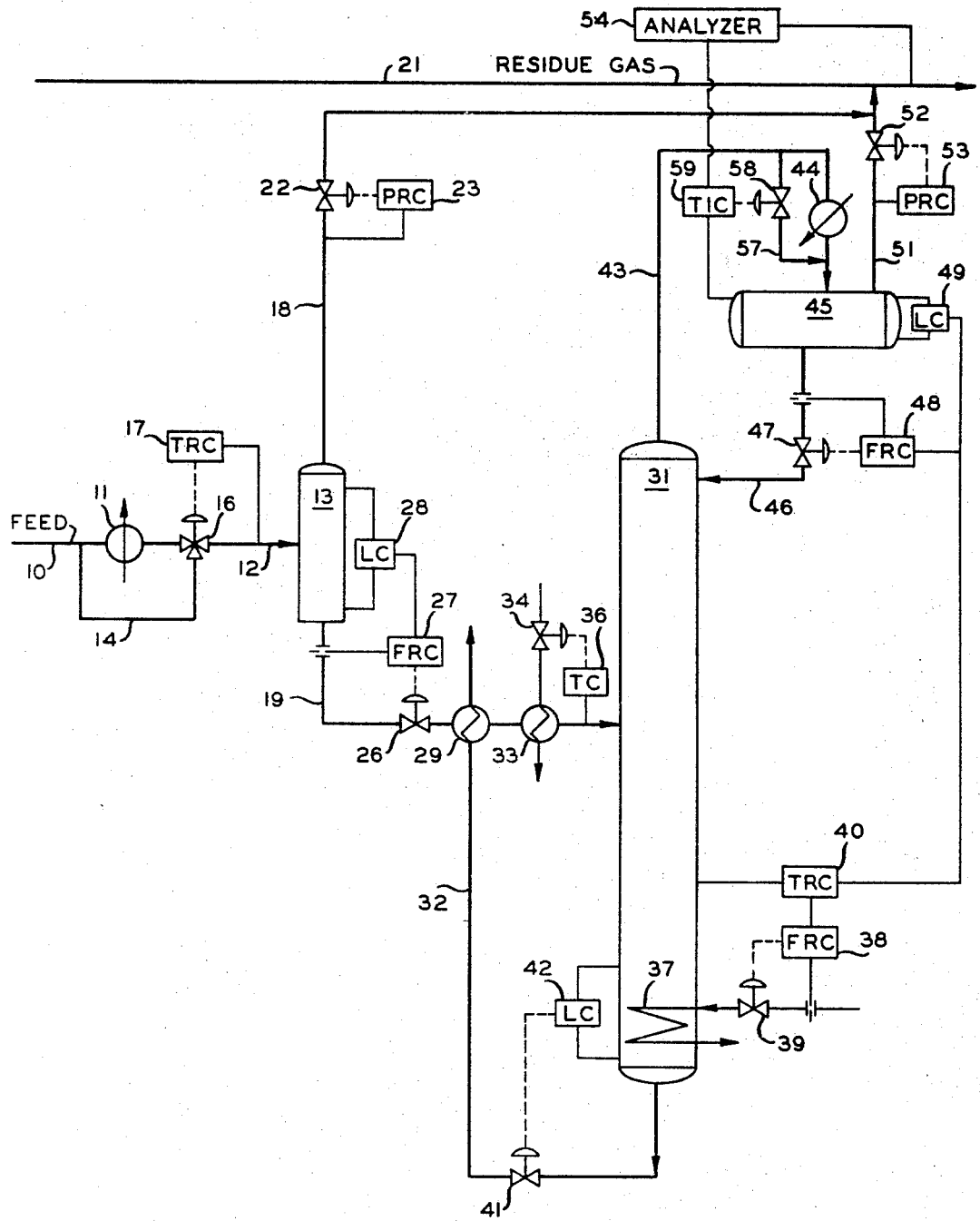
FIGURE 2 is a flow diagram of another embodiment of the invention.

FIGURE 2 illustrates another embodiment of the invention utilizing the same general flow diagram as embodied in FIGURE 1. In FIGURE 2, the feed stream in conduit 10 flows through heat exchanger 11, valve 16, and conduit 12 to flash tank 13. Temperature recorder controller 17 controls flow of bypassing fluids in conduit 14 to obtain a predetermined constant feed inlet temperature. From flash tank 13, the vapor fraction is passed through conduit 18 and conduit 51 to be combined with residue gas in conduit 21. Temperature recorder controller 17 is set at a minimum temperature which will allow efficient operation of fractionator 31. This provides for the maximum flow of feed to fractionator 31 wherein a better operation occurs, than in flash tank 13, to maintain the higher boiling hydrocarbons in the liquid product. The flash tank bottoms flow through conduit 19, heat exchanger 29, and heat exchanger 33 to fractionator 31.

The bottoms product is removed from fractionator 31 through conduit 32. Overhead vapors from fractionator 31 are recovered via conduit 43 and a portion of these are condensed by passing through a water-cooled condenser 44. A portion of the vapors in conduit 43 flow through conduit 57, bypassing condenser 44, and are mixed with the condensed liquid flowing to reflux accumulator 45. A valve 58 regulates the flow in bypass conduit 57. Temperature indicator controller 59 senses the temperature in accumulator 45 and controls valve 58 to obtain the desired temperature in accumulator 45. Analyzer 54 senses the heating value of the combined stream in conduit 21 and sets the temperature indicator controller 59 in accordance with the measured heating value. Thus, if the measured heating value falls below a predetermined level, analyzer 54 will reset the temperature indicator controller 59 to obtain a higher temperature in accumulator 45, thus more vapor will be bypassed through conduit 57 and go overhead through conduit 51 to enrich the residue gas.

Reflux liquid flows from accumulator 45 through conduit 46 to fractionator 31. Valve 47 controlled by flow recorder controller 48 regulates reflux flow. Liquid level controller 49 is provided to control flow and reset flow recorder controller 48 within a certain range of liquid level in accumulator 45. Outside of this range, liquid level controller 49 will reset temperature recorder controller 49 to vary the steam flow through valve 39 and obtain a temperature in fractionator 31 which will result in a desired liquid level in accumulator 45. This will result in bringing the liquid level in accumulator 45 back in the control range of liquid level controller 49 and flow recorder controller 48.

Thus (under substantially steady state flash tank and fractionator operation), the heating valve of the combined gas stream flowing in conduit 21 is maintained at a predetermined level by regulating the flow of vapors bypassing condenser 44 in accordance with the measured heating value. If conditions are such that the predetermined heating value cannot be maintained in this manner, the fractionator temperature can be varied in accordance with the liquid level in accumulator 45.

Reasonable modification and variation are within the scope of this invention. For example, the different embodiments illustrated in FIGURES 1 and 2 could be combined so that the feed inlet temperature, the steam flow to the fractionator, and the amount of vapors bypassing the reflux condenser could all be controlled by the measured heating value. The following example will serve to illustrate a specific embodiment of the invention.

EXAMPLE

In a specific embodiment of the invention, a feed material containing largely hydrocarbons, some nitrogen, and a small amount of helium is introduced into a low temperature helium extraction process where crude helium is therefrom extracted and the remaining hydrocarbons from the original feed are removed from the process as liquid and gas. It is economically essential that these hydrocarbon gas streams being removed from the process have a predetermined heating value to the process feed material previously mentioned.

As a consequence of removing said helium from the hydrocarbon feed, it is necessary for several vapor-liquid separations to be effected. As a result of this process, the primary hydrocarbon residual gaseous stream which contains some nitrogen is below the heating value of the feed stream. Since it is desirable to discharge the primary hydrocarbon residual stream at the same heating value level as prior to extraction or to some predetermined value, certain minor hydrocarbon streams are separated within the extraction process, whereupon the streams are themselves separated into lighter and heavier fractions, the lighter portions of said separated fractions are utilized to increase the heating value of the primary hydrocarbon residual stream to a heating value level equivalent to that of the feed material. This invention controls the amount of lighter separated fractions that must be added to the primary residual hydrocarbon stream to elevate its heating value to the level of the feed stream.

Utilizing the flow diagram illustrated in FIGURE 2, a minor hydrocarbon stream comprising of 11,234 mols/day of (by weight) 1.17 percent $N_2$, 21.02 percent $C_1$, 13.57 percent $C_2$, 28.73 percent $C_3$, 20.48 percent $C_4$, 15.03 percent $C_5$, trace helium, at $-40°$ F. and 397 p.s.i.g. initially flows through conduit 10. A stream, representing 70–100 percent of the original stream, is introduced into heat exchanger 11 whereupon the temperature of the stream is increased. The stream flowing through conduit 14, representing 0–30 percent of the original (but normally 20 percent), is adiabatically and isothermally conducted around heat exchanger 11 and joined with the first stream in such proportions that will result in a predetermined and constant combined stream temperature. The temperature that is to be desired is that temperature that will produce a stream sufficient in heating value to upgrade the deficient stream to a required level. This combined and temperature regulated stream is then introduced into flash tank 13 where a one-step vapor-liquid separation is effected. The 2,233 mols/day vapor product from the flash tank which consists of 0.02 percent helium, 5.10 percent $N_2$, 63.82 percent $C_1$, 15.36 percent $C_2$, 11.93 percent $C_3$, 3.14 percent $C_4$, 0.63 percent $C_5$, at $60°$ F. and 382 p.s.i.g. flows through conduit 18 and is combined with an overhead fractional distillation product to be subsequently described. The combined streams are then added to a 36,971 lb./hr. primary hydrocarbon residual stream so as to elevate its heating value to that of the original feed to the helium extraction process.

The 9,001 mols/day liquid product from flash tank 13 containing 0.19 percent $N_2$, 10.40 percent $C_1$, 13.13 percent $C_2$, 32.89 percent $C_3$, 24.79 percent $C_4$, 18.60 percent $C_5$, at $60°$ F. and 382 p.s.i.g. is heated by two heat exchangers, 29 and 33, whereupon a portion of the volatile components are converted to vapor. This vapor-liquid stream is then conducted into a fractional distillation tower 31. The overhead vapor flows through conduit 43, a portion flowing through bypass conduit 57. The flow of vapors through conduit 57 is regulated by temperature controller 59 in accordance with the heating value measured by analyzer 54. The 4,873 mols/day vapor product from the reflux accumulator 45 of 0.35 percent $N_2$, 19.21 percent $C_1$, 24.25 percent $C_2$, 55.92 percent $C_3$, 0.27 percent $C_4$, at $97.5°$ F. and 330 p.s.i.g. flows through conduit 51 and is combined with the overhead flash tank product previously described. The combined streams are used to elevate the heating level of the primary hydrocarbon residual stream, as has previously been described.

The overhead flash product and the overhead fractional distillation product, which are (combined and) added to upgrade the primary hydrocarbon residual stream, product a stream of 7,106 mols/day of 1.86 percent $N_2$, 33.22 percent $C_1$, 21.46 percent $C_2$, 42.09 percent $C_3$, 1.17 percent $C_4$, 0.20 percent $C_5$, trace helium, at $89°$ F. and 260 p.s.i.g.

The bottoms product from the fractional distillation column consisting of 4,128 mols/day of 5.72 percent $C_3$, 53.73 percent $C_4$, 40.55 percent $C_5$, at $277°$ F. and 377 p.s.i.g. is utilized as input energy in heat exchanger 26 which heats the fractional distillation column feed (and is then recovered).

Thus, the primary residual hydrocarbon stream is upgraded in heating value while recovering a maximum of bottoms product from the fractional distillation column.

That which is claimed is:

1. A method of maintaining within a predetermined range the heating value of a first gas stream comprising the steps of:
    flashing an at least partially liquefied stream at a controlled pressure to produce a first vapor fraction having a heating value above said predetermined range and a first liquid fraction;
    combining the first vapor fraction with said first gas stream;
    fractionating said first liquid fraction to obtain a second vapor fraction and A second liquid fraction;
    combining the second vapor fraction with said first gas stream;
    measuring the heating value of said first gas stream containing the first vapor fraction and the second vapor fraction;
    maintaining said controlled pressure substantially constant; and
    regulating the temperature of said flashing step in accordance with said measured heating value to increase the temperature in said flashing step to vaporize a greater portion of said at least partially liquefied stream and thus raise the heating value of the first vapor fraction when the measured heating value of said first gas stream containing said first and second vapor fractions is below said predetermined range and to decrease the temperature of said flashing step to vaporize a lesser portion of said at least partially liquefied stream and thus lower the heating value of the first vapor fraction when the measured heating value of the first gas stream containing said first and second vapor fractions is above said predetermined range, to thereby maintain the heating value of said first gas stream containing said first and second vapor fractions within said range while obtaining the maximum amount of said second liquid fraction.

2. The method of claim 1 wherein the temperature of said flashing step is regulated by controlling the temperature of said at least partially liquefied stream in accordance with said measured heating value.

3. A method of maintaining within a predetermined range the heating value of a first gas stream comprising the steps of:
    maintaining the temperature of an at least partially liquefied stream substantially constant at a desired value;
    flashing said at least partially liquefied stream at a controlled substantially constant pressure to produce a first vapor fraction having a heating value above said predetermined range and a first liquid fraction;

combining the first vapor fraction with said first gas stream;

fractionating said first liquid fraction to obtain a second vapor fraction having a heating value above said predetermined range and a second liquid fraction;

combining the second vapor fraction with said first gas stream;

measuring the heating value of said first gas stream containing the first vapor fraction and the second vapor fraction; and regulating the temperature of said fractionating step in accordance with said measured heating value to increase the temperature of said fractionating step to vaporize a greater portion of the feed thereto and thus raise the heating value of the second vapor fraction when the measured heating value of said first gas stream containing said first and second vapor fractions is below said predetermined range and to decrease the temperature of said fractionating step to vaporize a lesser portion of the feed thereto and thus lower the heating value of the second vapor fraction when the heating value of the first gas stream containing said first and second vapor fractions is above said predetermined range, to thereby maintain the heating value of said first gas stream containing said first and second vapor fractions within said range while obtaining the maximum amount of said second liquid fraction.

4. The method of claim 3 wherein said temperature of said fractionation step is regulated by controlling the temperature of a reflux stream to said fractionation step.

5. The method of claim 3 wherein the temperature of said fractionation step is regulated by controlling the amount of heat input to said fractionation step.

6. A method of maintaining within a predetermined range the heating value of a first gas stream comprising the steps of:

flashing a fluid stream to produce a first vapor fraction having a heating value above said predetermined range and a first liquid fraction;

combining the first vapor fraction with said first gas streams;

fractionating said first liquid fraction to obtain a second vapor fraction and a second liquid fraction;

combining the second vapor fraction with said first gas stream;

measuring the heating value of said first gas stream containing the first vapor fraction and the second vapor fraction; and regulating the temperature of said flashing step and the temperature of said fractionating step in accordance with said measured heating value to increase the temperature and thus raise the heating value of the combined vapor fractions when the measured heating value of said first gas stream containing said first and second vapor fractions is below said predetermined range and to decrease the temperature and thus lower the heating value of said vapor fractions when the measured heating value of the first gas stream containing said first and second vapor fractions is above said predetermined range.

7. The method of claim 6 wherein the temperature of said flashing step in regulated by controlling the temperature of said fluid stream in accordance with said measured heating value.

8. The method of claim 6 wherein the temperature of said fractionating step is regulated by controlling the temperature of a reflux stream to said fractionation step.

9. The method of claim 6 wherein the temperature of said fractionation step is regulated by controlling the amount of heat input to said fractionation step.

References Cited

UNITED STATES PATENTS

| | | | |
|---|---|---|---|
| 2,074,978 | 3/1937 | Brandt | 208—341 |
| 2,547,970 | 4/1951 | Phillips et al. | 208—341 |
| 2,564,791 | 8/1951 | Ribble | 208—341 |
| 2,630,403 | 3/1953 | Miller | 208—354 |
| 2,771,149 | 11/1956 | Miller et al. | 208—341 |
| 3,197,138 | 7/1965 | Lupfer | 208—341 |

DELBERT E. GANTZ, *Primary Examiner.*

HERBERT LEVINE, *Assistant Examiner.*

U.S. Cl. X.R.

208—340, 351, 361; 48—196

UNITED STATES PATENT OFFICE

CERTIFICATE OF CORRECTION

Patent No. 3,429,805    Dated: February 25, 1969

Inventor: Joseph T. Karbosky

It is certified that error appears in the above-identified patent and that said Letters Patent are hereby corrected as shown below:

Lines 3 and 4 of the heading at the top of column 1 of the specification should read as follows:

— Joseph T. Karbosky, Bartlesville, Oklahoma, assignor to Phillips Petroleum Company, a corporation of Delaware —

Column 6, line 35, "A" should read --- a ---.
Column 7, line 42, "streams" should read -- stream --.
Column 8, line 19, "in" should read -- is --.

SIGNED AND
SEALED
JUN 16 1970

(SEAL)
Attest:

Edward M. Fletcher, Jr.
Attesting Officer

WILLIAM E. SCHUYLER, JR.
Commissioner of Patents